UNITED STATES PATENT OFFICE.

MAJOR E. HOLMES, OF LAKEWOOD, OHIO, ASSIGNOR TO NATIONAL CARBON COMPANY, OF CLEVELAND, OHIO, A CORPORATION OF NEW JERSEY.

ELECTRIC BATTERY.

1,216,450. Specification of Letters Patent. Patented Feb. 20, 1917.

No Drawing. Original application filed November 21, 1912, Serial No. 732,615. Divided and this application filed July 23, 1913. Serial No. 780,674.

*To all whom it may concern:*

Be it known that I, MAJOR E. HOLMES, a citizen of the United States, residing at Lakewood, in the county of Cuyahoga and State of Ohio, have invented a certain new and useful Improvement in Electric Batteries, of which the following is a full, clear, and exact description.

My invention relates to depolarizers for dry batteries and particularly for that type known as "midget" batteries, as also described in my application Serial No. 732,615, filed November 21st, 1912, of which this application is a division.

Pyrolusite or manganese peroxid as it occurs in nature is used as a depolarizer in dry cells of ordinary size, but conditions met with in the small "midget" dry cells are so different that pyrolusite produces a very inferior cell if used as a depolarizer in the latter. I have found that if a specially prepared manganese peroxid be used in the midget form of dry cell, the cell will be very much improved. The continuous service life, for instance, is four or five times as great as it would be if pyrolusite were used as depolarizer. The process by which I make this special form of manganese peroxid will be set forth in the appended description.

If to a solution of potassium permanganate, a solution of manganese chlorid is added, hydrated manganese peroxid will be precipitated, but if this is precipitated at temperatures much below 100 degrees C. it is very inferior as a depolarizer in the midget type of dry cells. I find that the depolarizer is more efficient if precipitated from a solution that is substantially at a temperature of 100 degrees C. I prefer to procure this temperature by the use of steam, as the steam aids in decreasing the density of the precipitate.

The reaction taking place is represented by the following equation.

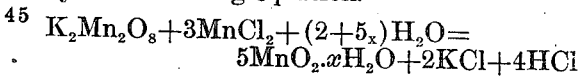

The precipitated manganese is hydrated, the amount of water uniting with it being represented by $x$. This compound might also be looked upon as having the following formula, $H_2MnO_3.xH_2O$, and therefore could be called manganous acid. Some of the hydrochloric acid reacts with the manganese peroxid to produce chlorin in accordance with the following equation:

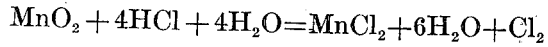

Only a part, however, of the acid thus reacts with the manganese peroxid. The chlorin aids in oxidizing the lower oxids of manganese, the following being a typical reaction:

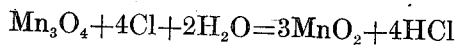

Since the lower oxids are formed to some extent the chlorin has a beneficial influence.

The precipitate obtained by the above process is dried at approximately 120 degrees C. and afterward calcined for about seven hours in the neighborhood of 300 degrees C. The calcination is necessary in order to dehydrate the precipitate as the ammonium chlorin in the cell electrolyte reacts therewith to produce hydrochloric acid, which attacks the zinc electrode, though calcination may be omitted when a good shelf life is not a desideratum. It will be noted from the above description that hydrochloric acid is formed from a secondary reaction. The calcination of the precipitate drives off that part of this hydrochloric acid that remains after the precipitate is washed. This acid should be eliminated as even small traces of it will shorten the shelf life of the cell.

Instead of using manganese chlorid as one of the solutions, I may use other manganese salts such as the sulfate for instance, but I prefer to use the chlorid on account of the oxidizing effect of the free chlorin as previously described.

An important advantage in making a battery depolarizer by a manganous salt (the chlorid, the sulfate, etc.,) by means of potassium permanganate arises from the fact that manganese peroxid is obtained both from the oxidizing and the oxidized material, resulting in a greater yield than if some other oxidizing agent were used. While I have referred to the product as "calcined manganese peroxid," "dehydrated manganese peroxid," "anhydrid of manganous acid," etc., it must nevertheless be understood that the compound $MnO_2$ is not an absolutely stable compound in the air. It slowly gives off oxygen to form manganomanganites of the following variable formula: $x$MnO.$y$MnO$_2$ but in the main the product will be MnO$_2$. If allowed to give off oxygen until equilibrium is established, the product would substantially be 1MnO.5MnO$_2$.

In my prior application, I have claimed the process for producing the depolarizer and in this application I claim the combination of the depolarizer with the elements of a dry cell with which it acts to produce a new and useful result.

Having described my invention what I claim is:

1. In a dry cell, a positive electrode, a negative electrode and a depolarizer consisting of precipitated manganese peroxid calcined to approximately 300 degrees C.

2. In a dry cell, a positive electrode, a negative electrode and a depolarizer consisting of artificial manganese peroxid calcined above 200 degrees C.

3. In a dry cell, a positive electrode, a negative electrode and a depolarizer consisting of manganese peroxid precipitated from a hot solution of potassium permanganate.

4. In a dry cell a positive electrode, a negative electrode, and a depolarizer consisting of manganese peroxid precipitated from a manganous salt solution by means of potassium permanganate.

5. In a dry cell, a positive electrode, a negative electrode, and a depolarizer consisting of manganese peroxid precipitated from a solution of manganous chlorid by means of potassium permanganate maintained at approximately 100° C.

6. In a dry cell, a positive electrode, a negative electrode and a depolarizer consisting of dehydrated manganese peroxid precipitate.

In testimony whereof, I hereunto affix my signature.

MAJOR E. HOLMES.

Witnesses:
IRA J. ADAMS,
H. G. GROVER.